US008565766B2

(12) United States Patent
Scherzer et al.

(10) Patent No.: US 8,565,766 B2
(45) Date of Patent: *Oct. 22, 2013

(54) DYNAMIC NETWORK CONNECTION SYSTEM AND METHOD

(75) Inventors: Shimon Scherzer, Ramot Hashavim (IL); Tamir Scherzer, Herzelia (IL); Eran Naveh, Ramat Gan (IL); Nadav Smilansky, Tel Aviv (IL)

(73) Assignee: WeFi Inc., Marlborough, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/362,554

(22) Filed: Jan. 31, 2012

(65) Prior Publication Data

US 2012/0196644 A1    Aug. 2, 2012

Related U.S. Application Data

(63) Continuation-in-part of application No. 12/180,159, filed on Jul. 25, 2008, now Pat. No. 8,126,476, which is a continuation-in-part of application No. 11/743,853, filed on May 3, 2007, now Pat. No. 8,000,276.

(60) Provisional application No. 60/888,291, filed on Feb. 5, 2007, provisional application No. 61/437,991, filed on Jan. 31, 2011.

(51) Int. Cl.
*H04W 4/00* (2009.01)

(52) U.S. Cl.
USPC ............... 455/435.2; 455/435.1; 455/432.3

(58) Field of Classification Search
USPC .......... 370/310, 315, 318, 328, 329, 331; 455/456.1, 456.2, 456.3, 456.5, 456.6, 455/434, 432.3, 435.1, 435.2, 435.3, 452.1, 455/452.2, 414.1, 552, 509
See application file for complete search history.

(56) References Cited

U.S. PATENT DOCUMENTS

| | | | |
|---|---|---|---|
| 7,054,627 B1 | 5/2006 | Hillman | |
| 7,103,661 B2 | 9/2006 | Klein | |
| 7,236,798 B2 | 6/2007 | Beuck | |
| 7,266,595 B1 | 9/2007 | Black et al. | |
| 7,323,991 B1 | 1/2008 | Eckert et al. | |
| 7,483,984 B1 | 1/2009 | Jonker et al. | |
| 7,613,427 B2 | 11/2009 | Blight et al. | |
| 7,940,731 B2 | 5/2011 | Gao et al. | |
| 2004/0066759 A1 | 4/2004 | Molteni et al. | |
| 2004/0203745 A1* | 10/2004 | Cooper | 455/432.1 |
| 2005/0070279 A1 | 3/2005 | Ginzburg et al. | |

(Continued)

*Primary Examiner* — Jean Gelin
(74) *Attorney, Agent, or Firm* — Finnegan, Henderson, Farabow, Garrett & Dunner, LLP

(57) ABSTRACT

A method and system for selecting a network to establish a connection to from a set of available network includes a network database providing historical information about each of the networks and sends the database information to end user terminals. The end user terminals monitor real-time performance information about each of the available networks and can send this information to the network database. The end user terminals also include network connection policy information which can be used to make the selection decision. The end user terminal determines a network quality score for each available network as a function of the historical information from the network database, the real-time performance information about each available network and the network connection policy information. The end user terminal can select the available network as a function of the network quality score, for example, selecting the available network with the highest network quality score.

15 Claims, 5 Drawing Sheets

(56) References Cited

U.S. PATENT DOCUMENTS

| | | |
|---|---|---|
| 2005/0202828 A1* | 9/2005 | Pecen et al. .................. 455/453 |
| 2005/0232189 A1 | 10/2005 | Loushine |
| 2006/0046661 A1* | 3/2006 | Ekvetchavit et al. ...... 455/67.11 |
| 2006/0095348 A1 | 5/2006 | Jones et al. |
| 2006/0095349 A1 | 5/2006 | Morgan et al. |
| 2006/0168438 A1 | 7/2006 | Klein |
| 2006/0171348 A1 | 8/2006 | Nokano |
| 2006/0217131 A1 | 9/2006 | Alizadeh-Shabdiz et al. |
| 2007/0004427 A1 | 1/2007 | Morgan et al. |
| 2007/0004428 A1 | 1/2007 | Morgan et al. |
| 2007/0010248 A1 | 1/2007 | Dravida et al. |
| 2007/0019670 A1 | 1/2007 | Falardeau |
| 2007/0019679 A1* | 1/2007 | Scheck et al. ................. 370/480 |
| 2007/0066304 A1 | 3/2007 | Lee |
| 2007/0079376 A1 | 4/2007 | Robert et al. |
| 2007/0121560 A1 | 5/2007 | Edge |
| 2007/0171881 A1 | 7/2007 | Zhang et al. |
| 2007/0184845 A1 | 8/2007 | Troncoso |
| 2007/0275701 A1 | 11/2007 | Jonker |
| 2008/0013487 A1 | 1/2008 | Molteni et al. |
| 2010/0296441 A1 | 11/2010 | Barkan |
| 2011/0035420 A1 | 2/2011 | Alizadeh-Shabdiz et al. |
| 2011/0143756 A1 | 6/2011 | Gallagher et al. |

* cited by examiner

DYNAMIC NETWORK CONNECTION SYSTEM AND METHOD

CROSS-REFERENCE TO RELATED APPLICATIONS

This Application is a continuation-in-part of U.S. application Ser. No. 12/180,159, filed 25 Jul. 2008, the entire disclosure of which is incorporated herein by reference. U.S. application Ser. No. 12/180,159 is a continuation-in-part of U.S. application Ser. No. 11/743,853, filed 5 Feb. 2007, now U.S. Pat. No. 8,000,276, the entire disclosure of which is incorporated herein by reference. U.S. application Ser. No. 11/743,853 claims the benefit of priority to U.S. Application Ser. No. 60/888,291 filed 5 Feb. 2007. This application claims any and all benefits as provided by law of U.S. Provisional Application No. 61/437,991 filed 31 Jan. 2011, which is hereby incorporated by reference in its entirety.

BACKGROUND

1. Technical Field of the Invention

The present invention is directed to methods and systems in wireless user terminals, such as mobile smart phones, for detecting wireless networks and determining when to use the current network or select other wireless networks for communication. Using real-time information about wireless network performance conditions and historical wireless network performance information along with network operator policies, the decision to use one wireless network service over another can be optimized to provide an improved end user experience.

2. Description of the Prior Art

Cellular networks generally consist of two main parts: the radio access subsystem and the core network. The rapid increase of data usage and resulting network congestion give rise to the need for integration of multiple radio access (wireless) technologies other than the traditional cellular radios (most notably—WLAN or WiFi). The industry is taking various steps to facilitate this by incorporating WLAN and other access techniques in mobile terminals and building internetworking solutions to allow session persistence while connecting an ongoing "call" between various access technologies etc.

WLAN (e.g., WiFi) has recently become the alternate network of choice for data offloading. However, due to some fundamental differences between traditional cellular technology and WLAN, incorporating WLAN into the mix of "legitimate" access technologies serving the mobile networks has few unique challenges. WLAN transmission power is severely limited in comparison to its cellular counterpart; consequently WLAN radio coverage is rather limited and normally would not go beyond few tens of meters. To provide acceptable WLAN coverage one must deploy much larger amount of WLAN access points then done in cellular deployment. Higher deployment density (larger number of deployment sites) results with higher maintenance cost thereby defeating the purpose of lowering service cost. Unlike cellular technology that operates in a "private" (licensed) spectrum, WLAN needs to function within hostile conditions of unlicensed spectrum; radio interference is uncontrolled in these spectrum bands. Consequently operators find it very difficult to assure an acceptable quality of service (QoS) putting in question the use of WLAN altogether.

The common WLAN solution offered to operators is basically replicating cellular operator's deployment. Companies are deploying WLAN access points at specific locations where they expected increase data traffic (hotels, airports, large stores etc.). This solution could be adequate when user terminals were mostly laptops that are not very mobile. The deployed networks are managed using traditional network/cellular management techniques. As mentioned above, providing highly ubiquitous WLAN coverage using this approach is not practical due to maintenance cost considerations.

As time progresses, much higher mobility devices are becoming common; smart-phones such as iPhone and Android devices are rapidly becoming main data traffic contributors hence the selected locations model is quickly becoming obsolete. The need for ubiquitous WLAN coverage is growing further challenging the operator's style deployment.

The industry, through its standardization process, has been defining a new core network function to support heterogeneous radio access environment: the Access Network Discovery and Selection Function (ANDSF). The ANDSF is aimed to guide mobile terminals in finding alternate access networks and select the most suitable network for best service. Currently, the ANDSF is designed to support locating "carrier WLAN" and selecting the access network based on administrative policies. For example—connect to WLAN if there is a roaming agreement with the WLAN owner. No mechanism has been defined to dynamically improve the effectiveness of these policies by testing their impact on service quality or performance. This shortcoming is especially critical when dealing with WLAN where operation environment is less predictable due to the issues mentioned above.

Currently there is no way to enable a device to execute a policy based on anticipated QoS needs, for example: Connect to WLAN only if the WLAN is currently likely to provide a good service, and the cellular network is likely to be congested now. Furthermore, the likelihood of having the WLAN access option at any time is rather small due to the limited coverage provided by the "carrier WLAN" due to economical constrains as explained above. Therefore data offloading using carrier WLAN may not be very effective.

To avoid QoS problems, it has been suggested to let the mobile terminal decide which network to prefer based on "local snooping". For example, a mobile terminal can sequentially connect to each of the access networks in reach and evaluate their data speed capability. This method will consume a substantial amount of time and will be highly inaccurate as the short term signal and load fluctuations may cause erroneous decision. These operations may require substantial amount of connections (switching connections) and even then, the decision will be sub-optimal. Frequent connection alterations can easily overload the network's control plan ("ping-pong") resulting with horrible user experience. This application proposes an enhancement to ANDSF to improve network selection and specifically increase WLAN availability and connection quality.

Excerpts from 3GPP Standards Regarding ANDSF

This section provides for an overview of 3GPP requirement for ANDSF. The following is an extract from TS23.402.

The ANDSF contains data management and control functionality necessary to provide network discovery and selection assistance data as per operators' policy. The ANDSF shall respond to UE requests for access network discovery information (pull mode operation) and may be able to initiate data transfer to the UE (push mode operation), based on network triggers or as a result of previous communication with the UE.

The ANDSF shall be able to provide the following information:

1) Inter-system mobility policy:

The inter-system mobility policy is a set of operator-defined rules and preferences that affect the inter-system mobility decisions taken by the UE. The UE uses the inter-system mobility policy when it can route IP traffic only over a single radio access interface at a given time (e.g. is not IFOM capable or its IFOM capability is disabled) in order to:
(i) decide when inter-system mobility is allowed or restricted; and
(ii) to select the most preferable access technology type or access network that should be used to access EPC.

For example, an inter-system mobility policy may indicate that inter-system handover from E-UTRAN access to WLAN access is not allowed. It may also indicate e.g. that WiMAX access is more preferable to WLAN access.

The inter-system mobility policy may be provisioned in the UE and may be updated by the ANDSF based on network triggers or after receiving a UE request for network discovery and selection information.

The inter-system mobility policy identifies which access technology type or which specific access network is mostly preferable for EPC access. It shall be able to indicate:

If a specific access technology type is preferable to another (e.g. WiMAX is preferable to WLAN).

If a specific access network identifier is preferable to another (e.g. WLAN SSID-1 is preferable to WLAN SSID-2).

The inter-system mobility policy identifies also when inter-system mobility is allowed or restricted. It shall be able to indicate:

If inter-system mobility is restricted from one access technology type to another (e.g. handover from WiMAX to WLAN is restricted).

If inter-system mobility is restricted when certain conditions are met.

Validity conditions, i.e. conditions indicating when a policy is valid (such conditions may include e.g. a time duration, a location area, etc.). The validity conditions may also indicate when the UE shall request for new policies.

The inter-system mobility policy indicates whether the operator-preferred list of access networks or access technology types for EPC access, shall take precedence over corresponding user-preferred list, when automatic access network selection is used.

2) Access network discovery information:

Upon UE request, the ANDSF may provide a list of access networks available in the vicinity of the UE for all the access technology types requested by the UE (if any requested).

The ANDSF provides information for access networks that are available to the UE including:

the access technology type (e.g. WLAN, WiMAX).

the radio access network identifier (e.g. the SSID of a WLAN).

other technology specific information, e.g. one or more carrier frequencies.

validity conditions, i.e. conditions indicating when the provided access network discovery information is valid (such conditions may include e.g. a location).

The UE may retain and use the access network discovery information provided by the ANDSF until new/updated information is retrieved.

3) Inter-System Routing Policy:

The ANDSF may provide a list of Inter-System Routing Policies to UEs that are capable of routing IP traffic simultaneously over multiple radio access interfaces. The UE uses the inter-system routing policies when it can route IP traffic simultaneously over multiple radio access interfaces (e.g. it is an IFOM capable UE with the IFOM capability enabled) in order to meet the operator routing/offload preferences by:
(i) deciding when an access technology type/access network is restricted for a specific IP traffic flow and/or a specific APN; and
(ii) selecting the most preferable access technologies/access networks and/or APNs which shall be used by the UE when available to route IP traffic that matches specific criteria (e.g. all traffic to a specific APN, or all traffic belonging to a specific IP flow, or all traffic of a specific application, etc).

The inter-system routing policy may be provisioned in the UE and may be updated by the ANDSF based on network triggers or after receiving a UE request for network discovery and selection information.

Each inter-system routing policy includes the following information:

Validity conditions, i.e. conditions indicating when the provided policy is valid.

One or more Filter Rules, each one identifying a prioritized list of access technologies/access networks which shall be used by the UE when available to route traffic that matches specific IP filters and/or specific APNs. A filter rule also identifies which radio accesses are restricted for traffic that matches specific IP filters and/or specific APNs (e.g. WLAN is not allowed for traffic to APN-x).

A Filter Rule may also identify which traffic shall or shall not be non-seamlessly offloaded to a WLAN when available, if the UE supports the non-seamless WLAN offload capability specified in clause 4.1.5.

There are three types of information provided by the ANDSF, i.e. the inter-system mobility policy, the access network discovery information and the inter-system routing policy. The ANDSF may provide all types of information or only one of them. The user may manually select the access technology type or access network that should be used by the UE; in such a case the inter-system mobility policies are not taken into account.

UE with ANDSF Requirements

If the UE has access to network discovery information, inter-system mobility policies or inter-system routing policies are valid for its present location, which indicate that there is an access network in its vicinity with higher priority than the currently selected access network(s), the UE should perform procedures for discovering and reselecting the higher priority access network, if this is allowed by user preferences.

A UE that is not capable of routing IP traffic simultaneously over multiple radio access interfaces (e.g. a non-IFOM or non-MAPCON capable UE, or a UE not capable of non-seamless WLAN offload) shall select the most preferable available access network for inter-system mobility based on the received/provisioned inter-system mobility policies and user preferences. When automatic access network selection is used, the UE shall not initiate a connection to the EPC using an access network indicated as restricted by inter-system mobility policies. When the UE selects a non-3GPP radio access as indicated by the preferences in the inter-system mobility policies, the UE may still use 3GPP access for CS services.

A UE that is capable of routing IP traffic simultaneously over multiple radio access interfaces (i.e. an IFOM or MAPCON capable UE, or a UE capable of non-seamless WLAN offload) may be pre-provisioned with or shall be able to receive from the ANDSF (if the UE supports communication with ANDSF) both inter-system mobility policies and inter-system routing policies. When the UE has the IFOM, the MAPCON and the non-seamless WLAN offload capabilities disabled, the UE shall select the most preferable available access network based on the received/provisioned inter-system mobility policies and user preferences. When the UE has the IFOM or MAPCON or non-seamless WLAN offload capability enabled, the UE shall select the most preferable available access networks based on the received/provisioned inter-system routing policies and user preferences. In addition, the UE shall route traffic that matches specific criteria according to the filter rules in the received/provisioned inter-system routing policies and according to the user preferences.

When roaming, it shall be possible for the UE to resolve potential conflicts between the policies provided by the Home ANDSF (H-ANDSF) and the policies provided by the Visitor ANDSF (V-ANDSF). This applies to both the inter-system mobility policies and to the inter-system routing policies.

The ANDSF shall be able to limit the amount of information provided to the UE based e.g. on the UE's current location, UE capabilities, etc. The ANDSF shall be able to limit the load caused by the UE initiated requests towards the ANDSF.

The H-ANDSF in the subscriber's home operator network may interact with other databases such as the HSS user profile information residing in subscriber's home operator network. Details of such interaction with these databases are not described in this Release of the specifications.

Inter-system mobility policies, access network discovery information and inter-system routing policies may also be statically pre-configured by the operator on the UE. The inter-system mobility policies, access network discovery information and inter-system routing policies provided to the UE by the ANDSF take precedence on the inter-system mobility policies, access network discovery information and inter-system routing policies pre-configured on the UE.

ANDSF/UE Communication Protocol

The protocol between ANDSF server to Client is based on OMA Device Management Protocol—"OMA-TS-DM_Protocol-V1_2-20060602-C"

The OMA Device Management Protocol allows management commands to be executed on nodes. It uses a package format similar to SyncML Synchronization Protocol [SYNCPRO] and SyncML Representation Protocol [REPPRO]. A node might reflect a set of configuration parameters for a device. Actions that can be taken against this node might include reading and setting parameter keys and values. Another node might be the run-time environment for software applications on a device. Actions that can be taken against this type of node might include installing, upgrading, or uninstalling software elements.

Actions are represented by OMA Device Management Protocol Commands, which are described in [REPPRO] and Device Management Usage [DMREPU]. The commands and message structure used correspond identically to that of the [SYNCPRO]. Thus, the DTD for the Management Protocol is the DTD from [SYNCPRO].

SUMMARY

The present invention is directed to methods and systems for receiving network connection information from two or more wireless user terminals (UEs), aggregating the connection information into a database where each network can be given a network quality score and the quality scores of one or more wireless networks can be used in conjunction with network connection policies to select the best wireless network for the existing environmental conditions—for example, connect to the network providing the highest bandwidth or lowest error rate or noise. The network selection decision can be changed dynamically as a function of the network policies, and network performance and conditions (quality scores and the individual connection information elements used to determine the quality score). By using real-time network performance information in combination with known historical network performance information, better network selection decisions can be made.

In prior art systems and devices, network policies typically define operational limits of the device without consideration of real-time or historical performance information. Thus, for example, a network policy can limit the ability of a device to establish a connection to networks and access points operated by the carrier or network operator. Under this policy, the device will not attempt to establish a connection with a third party network or access point, even where it has the capability. In accordance with some embodiments of the present invention, the network policy can be modified, enhanced or expanded, such that where the performance of the carrier/operator network is poor and below a predefined threshold, the policy can be modified to enable the connection to a third party network or access point. This aspect of the invention enables the carrier/operator to, for example, offload network traffic in the event of an outage or local system congestion to avoid poor user experience at the expense of purchasing bandwidth from a third party network. The policy can be changed by the operator/carrier by adjusting the threshold up or down to suit their needs. In addition, the network policy is dynamic in the sense that when carrier/operator network conditions improve (e.g., the outage is resolved or the congestion is abated) the user device can be reconnected to the carrier/operator network, minimizing the additional expense to the carrier/operator as well as the A database can be used to inform user terminals about usable wireless networks within range, for example—WiFi access points in its neighborhood. This database can collect connection information from two or more user terminals using crowd sourcing—user terminals within range of a wireless access point, connect to the access point and report on the connection status and performance of the access point. Since this database leverages crowd sourcing to identify and classify wireless access points, this approach can offer an order of magnitude more wireless access points than the carrier/partner's owned resources. In addition, the methods and systems according to the invention can be used to predict wireless and cellular service quality at given locations using "locations' score". This score can be used, in addition to other policy rules, to determine whether a wireless end user terminal should be taken off the cellular network and connected to one of the available wireless networks thereby reducing the likelihood of QoS related problems.

In accordance with some embodiments of the invention, a connection decision can be based on historical information of an end user's activity taking in account real-time information about the selected network at the time of the decision. In accordance with some embodiments of the invention, the wireless environment in a location or hotspot can be characterized using wireless activity history thereby facilitating high quality decision. Both WLAN and cellular connections can be evaluated. The connection decision can be made whereby the likelihood of necessary connection change is minimized.

Although the following description focuses on WLAN (WiFi) networks as an alternative to cellular networks one skilled in the art can apply the same principles to any wireless network, including other cellular or carrier data networks.

A networks resources database can be used to enhance the decision and selection capability. A software client in on or more end user terminals can collect and report on each available network's (including the cellular networks) performance to enable each network to classified and characterized base on real-time data and to aggregate the real-time data to provide a historical record of past performance at a given location at or over a particular time of day or period of time. Basic data analysis techniques, as well as data mining techniques can be used to determine a performance score for each network at a location where the reports were generated. These performance scores can be used in conjunction with predefined carrier policies to select the connection (e.g., cellular or other wireless resources) while avoiding connection hopping as the device searches for a reliable network connection. In addition, as network conditions at a location change (for example, new network infrastructure is installed), the carrier policies can be revised to accommodate the change to improve user experience.

The present invention is direct to a system and method of updating and optimizing network discovery and selection policies. The system can include a network server including a network database including connection and performance information about available networks. The network server can use connection and performance information from the network database to determine network quality score calculation methods and network quality scores. The network quality scores can be stored in the network database and sent to user terminals. The network server can also store network connection policies and send the network connection policies to user terminals. The user terminals can implement the connection policies received from the network server. The user terminals can collect network connection and performance information and send the network connection and performance information to the network server to be stored in the network database. The user terminals can use the network connection policies provided by network server to discover, select and connect to wireless networks. The network server can use the network connection and performance information from the user terminals to update the network records in the network database and then recalculate network quality scores and network connection policies that can be sent to user terminals to update the network quality scores and network connection policies in the user terminals.

In accordance with some embodiments of the invention, the network connection and performance information can include, for example, data speed, data speed variance, drop calls rate, packet error rate, packet loss rate, round trip delay, round trip delay variance, and received signal level, mean and variance.

In accordance with some embodiments of the invention, the network connection policy can include, for example, network connection selection priority indicating which networks, if any have priority for selection and connection, the amount of data that can be transferred over a selected network, network usage limitations (e.g., limitations on access time, bandwidth, data and connection speeds), available networks reporting instructions (e.g., when to generate reports about policy employment and what information to include the reports).

In accordance with some embodiments of the invention, the user terminals can send a report after executing a decision to establish a connection over an available wireless network. The report can be sent immediately after the connection is established or a predefined time period after the connection is established. The report can include the network connection policy and values of the parameters and weights what were applied to policy. The report can include user terminal performance information at the time the network connection policy was applied and the connection decision that was executed. The report can include the results of executing the decision (whether a network connection was established or not) and the network connection and performance information for the wireless network after the connection was established.

The network server can receive the reports from the user terminals and can update the network database to include the updated network performance information reported by the user terminal, the local network connection and performance detected by the user terminal and at least one trend indicating any changes (or no changes) in network performance over a defined period of time. The network server can also update the network connection policy as a function of the report information received from the user terminals.

The network connection policy can include network connection policy information and weighting values for determining network quality score values.

In accordance with some embodiments of the invention, the user terminals receive the connection policy information and upon detecting more than one available network, determine a network quality score for each available network as a function of network performance information parameters received from the network server and weighting values from the network connection policy. The network selection can be determined as a function of the network quality score for each available network wherein the network with the highest score is the selected network. The network selection can be determined as a function of the network quality score and the network usage information from the connection policy where one or more network usage information elements for a selected network is above a desired threshold.

DETAILED DESCRIPTION

Figure 1:
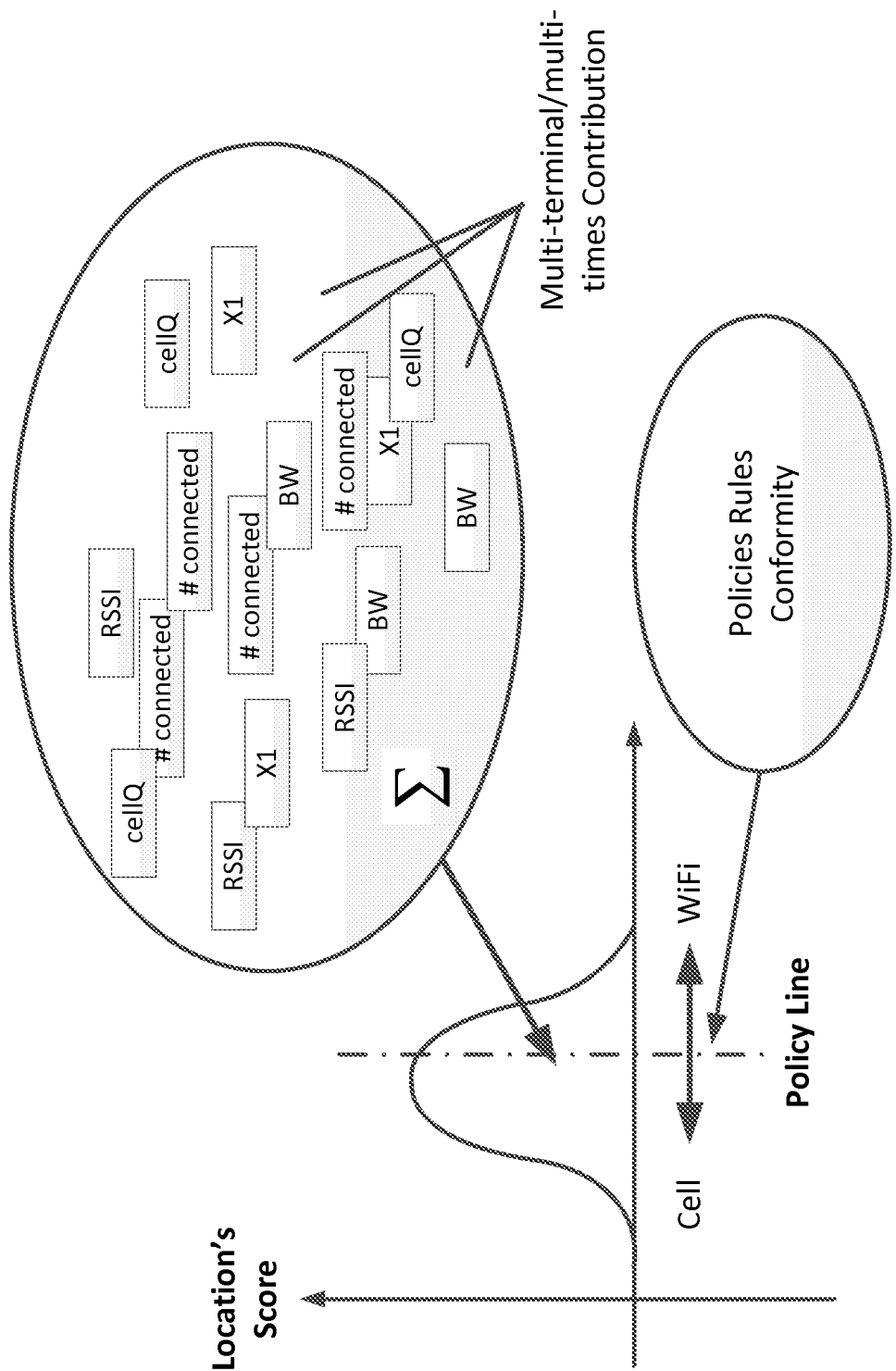
FIG. 1 is a diagrammatic view of a method according to the invention.

The present invention is directed to methods and systems for receiving network connection information from a plurality of wireless end user terminals (e.g., user equipment or UE), aggregating the connection information into a database where each wireless network or wireless network access point can be given one or more quality scores (under current policies) and the quality scores of one or more wireless network can be used in conjunction with network connection policies to influence wireless network selection decisions. The network selection decision can be changed, dynamically as a function of the network policies, quality scores and the individual connection information elements used to determine the quality score. By using real-time network performance information in combination with known historical network performance information, better network selection decisions can be made.

A database can be used to inform user terminals about usable networks within range, for example—WiFi access points in its neighborhood. This database can collect connection information from one or more user terminals using crowd sourcing—user terminals within range of a wireless access point, connect to the access point and report on the connection status and performance of the access point. Connection status and performance information can be collected as described in commonly owned U.S. application Ser. Nos. 11/743,853 and 12/180,159, the entire contents of each application are hereby incorporated by reference. The connection status and performance information can include information that can be used to identify the network (e.g., name, mac address, SSID, physical location), information that can be used to facilitate or enable a connection with network (e.g., encryption status, Gateway address, DNS address, Occupies IP addresses, captive portal credentials, connection technology, internet connectivity, physical location) and network performance information (e.g., connection technology, available bandwidth, allocated bandwidth, backhaul bandwidth or performance, internet connectivity, signal strength variance, percentage of availability, performance as a function of time of day and/or day of the week.) Since this database leverages crowd sourcing to identify and classify wireless access points, this approach can offer an order of magnitude more wireless access points than the carrier/partner's owned resources. In addition, the methods and systems according to the invention can be used to predict wireless and cellular service quality at any given location using a location based quality score. This quality score can be used, in addition to other policy rules, to determine whether a wireless end user terminal should be disconnected from the cellular network and connected to the available wireless networks thereby reducing the likelihood of QoS related problems.

In accordance with some embodiments of the invention, a connection decision can be based on historical information of an end user's activity and taking in account real time information about the selected network. In accordance with some embodiments of the invention, the wireless performance available in a location or hotspot can be characterized using current real-time information and historical wireless activity performance information thereby facilitating high quality decision. The historical wireless activity can be an aggregation of real-time data and historical data provided by many end user terminals that have connected to one or more networks or network access points over a period of time. In some embodiments, the historical data can be data (or derived from data) that was real-time data at one time. Both WLAN and cellular connections can be evaluated. The connection decision can be made whereby the likelihood of further, subsequent connection change is minimized.

In accordance with some embodiments of the invention, the real-time data can be derived from performance data collected by the end user terminal during normal operation, without probing or testing the network or the network access point. For example, the wireless radio receivers of the end user terminals can provide performance information as such as received signal strength, data rates and data error rates as part of normal operation of the device. Further, the end user device can collect this data over periods of time and calculate statistical measures, such as mean, variance and standard deviation of these measures which can also be considered performance information according to the invention. This performance information can be periodically collected and sent to the network server for storage in the network database as historical information. In accordance with some embodiments of the invention, the end user terminal can probe and/or test the wireless network or the network access point to determine other measures of performance, such as bandwidth, number of other users, signal delay, and backhaul bandwidth, that can be collected and sent to the network server for storage in the network database.

Although the following description focuses on WLAN (e.g., WiFi) networks as an alternative to cellular networks, one skilled in the art can apply same principles to any available wireless network.

A networks resources database can be used to provide the decision and selection capability. A software client in on or more end user terminals can report the device's and environment's data allowing both resource classification and characterization. Data mining techniques can be used to determine predicted performance score for each location where reports were generated. These performance scores can be used in conjunction with dictated carrier policies to select the connection (e.g., cellular or other wireless resources) while avoiding connection hopping as the device searches for a reliable network connection.

FIG. 1 shows a block diagram of one embodiment of the present invention. Two or more wireless end user terminals are capable of connecting to a network through a cellular data network connection and at least one wireless network connection. In accordance with the invention, two or more wireless end user terminals provide wireless and cellular network performance information 110 for an identified location at more than one time or over a period of time. This performance information can include connection status and performance information, for example, cellular signal quality information, wireless RSSI signal quality information, backhaul bandwidth, available network bandwidth, number of user terminals connected, and other performance information. The performance information can be stored in a performance database that can be accessed by the wireless end user terminal through either the cellular or any available wireless network. The wireless end user terminal can receive from the performance database, network performance information including a network quality score 115 and network policy information 120. The wireless end user terminal can be programmed to use the network policy information 120 to help determine which network to use for a particular service (e.g., data services, voice service, sms—text services). For example, where the user terminal can receive a network quality score 115 for the cellular network and one or more wireless networks within range of the user terminal. The user terminal can also receive policy information 120 from the performance database. The policy information 120 can include rules or quality score threshold information used by the user terminal to determine whether to stay connected to the cellular data network or to establish a data connection through another wireless network. For example, if the cellular network quality score 115 is below a policy threshold and a wireless network quality score 115 is above a policy threshold, the user terminal can establish a connection with an access point providing access to the wireless network having a higher quality score. Additional information can be used to further define the policy and trigger the network connection change. For example, the available bandwidth can also be considered in determining whether to use a wireless network instead of the cellular network. Further, historical information can also be used in determining whether to use a wireless network instead of the cellular network. For example, if historical data indicates that the available bandwidth will decrease by predetermined amount within a predetermined time (e.g., bandwidth will drop by 50% in the next half hour as more users are known to use the access point) then the user terminal can determine that using is the available cellular data connection is preferred. In some embodiments, the available bandwidth and historical information can be included in determining the quality score that is sent to the user terminal. Further, the quality score can be time limited (e.g., quality score for 2 pm to 4 pm at a given location) or include an expiration time (e.g., quality score expires in 1 hour), such that new quality scores can be generated in real-time based upon at least some real-time data or based on historical data and trends derived from real-time data.

Figure 2:
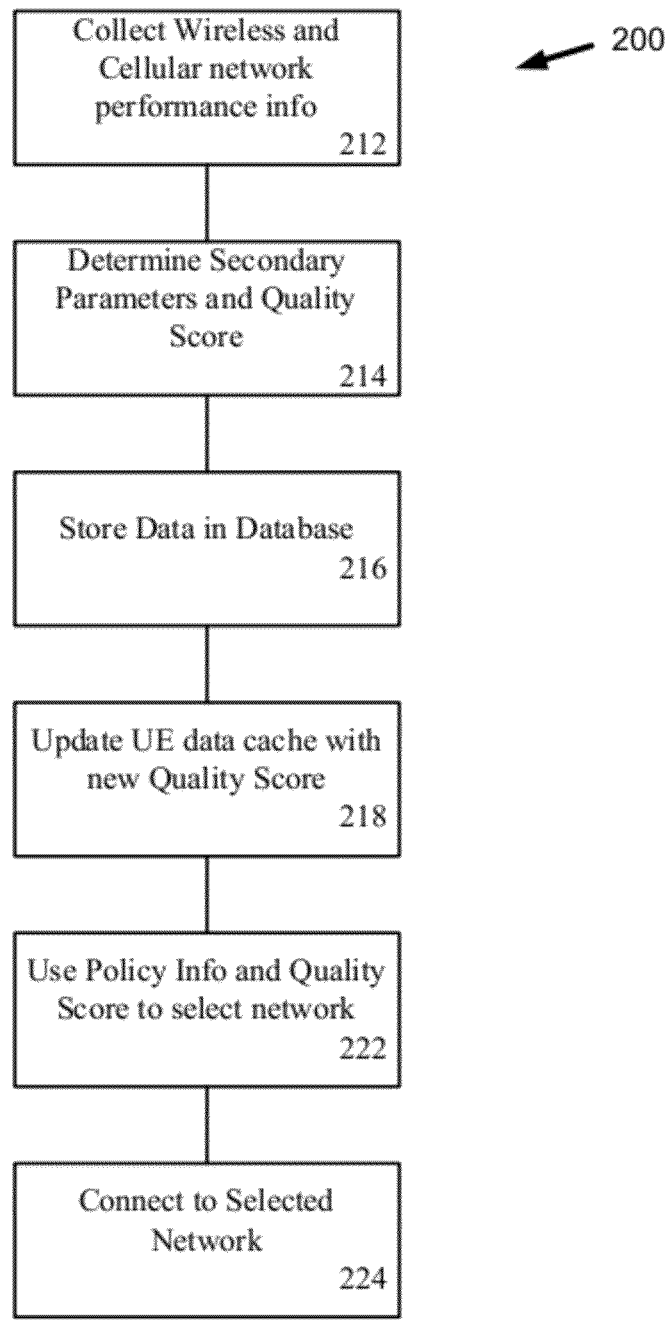
FIG. 2 is a diagrammatic view of a method according to the invention.

FIG. 2 shows a flow diagram of a method according to one embodiment of the invention. In accordance with the invention, for each location, the end user terminals can evaluate both cellular and wireless (e.g., WiFi, WiMAX) performance. As part of normal operation, at least some of the end user terminals gather performance information about the cellular and wireless networks at a location and forward this information to the server, 212. This information can include location identified information indicating network performance characteristics at the location, including, for example, estimated transmission bandwidth, signal strength and signal fluctuations for both the cellular and wireless networks. Secondary parameters, derived from the information received from the wireless user terminals, such as the mean and variance of these parameters can be determined and some or all of this information can be combined using modified linear combination or other functions to determine a location/access point/cellular network quality score, 214. The quality score can be added or updated for each wireless access point in the database, 216 and for each wireless access point (in the portion of the database) that is stored in the cache in the user terminal 218. In accordance with the invention, both wireless network access point quality information and the network policy data can be cached (and periodically updated) in the user terminal such that when the end user terminal detects multiple networks (including cellular and WiFi) it will be able to successfully select the best network to access 222 and establish a connection to that network 224. In accordance with some embodiments of the invention, the network quality information can include a single network quality score associated with a specific wireless network access point or the network quality information can include a set of network quality scores for a specific wireless network access point. In accordance with some embodiments of the invention, the set of network quality access scores can include parameters associated with one or more quality scores, for example, that indicate what time of day or day of the week a specific quality score is most relevant. In accordance with some embodiments of the invention, at least one quality score can be determined using real-time information provided by a wireless end user terminal. In accordance with some embodiments of the invention, at least one quality score can be determined using real-time information provided by a wireless end user terminal and historical information from the performance database. The real-time information and historical information can be weighted according a predetermined relevance of the information. For example, as the real-time information ages, it becomes less relevant and can be given less weight or where historical information consistently matches real-time data, the historical information can be assigned a higher weight.

Figure 3:
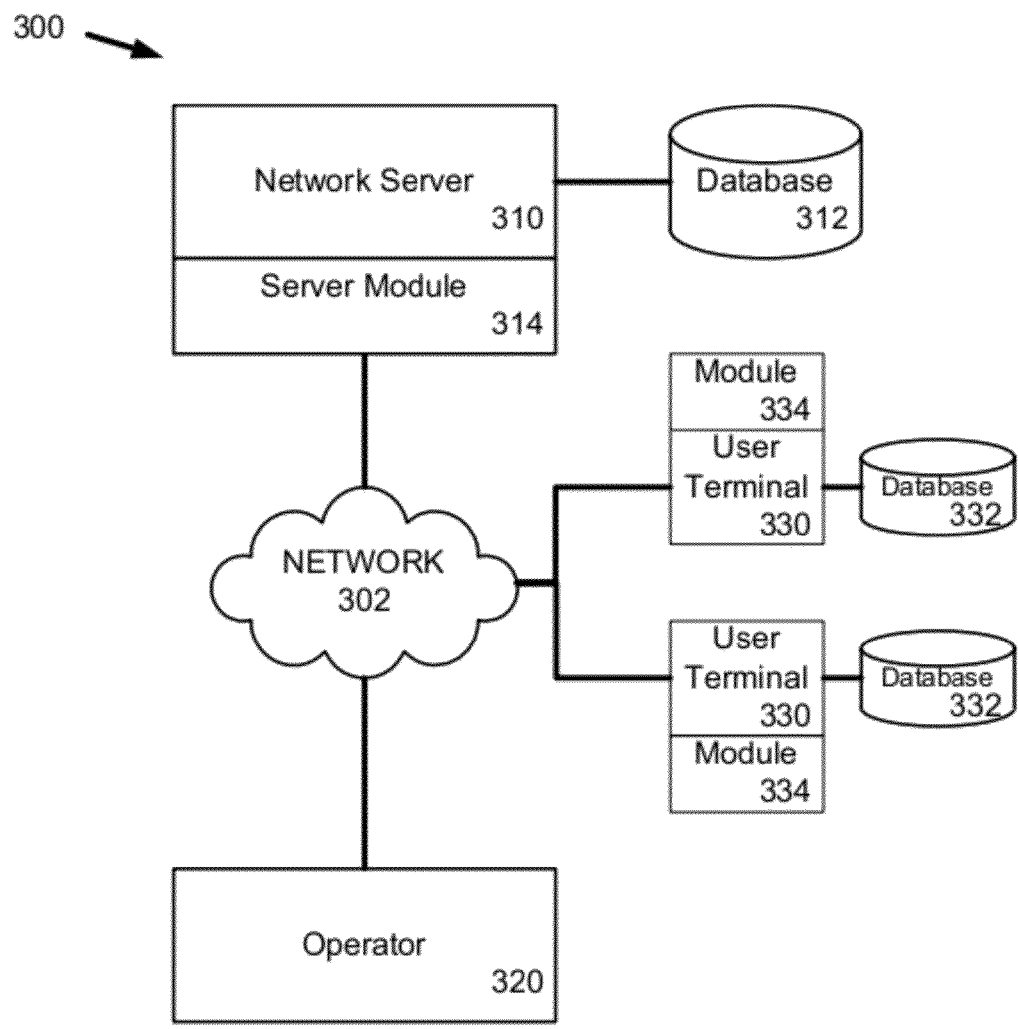
FIG. 3 is a diagrammatic view of a system according to the invention.

FIG. 3 shows a diagram of a system 300 according to the present invention. The system 300 can implement an enhanced Access Network Discovery and Selection Function (eANDSF). The system 300 can include one or more wireless network 302, an eANDSF network server 310 connected to one or more of the wireless networks 302, an operator computer 320 connected to one or more of the wireless networks 302 and one or more wireless end user terminals 330 connected to one or more of the wireless networks 302. The Network Server 310 can include one or more databases 312 or can be connected through one of the networks 302 or another network (not shown) to the database 312. Each of the wireless end user terminals 330 can also include a portion of the database 312, for example, stored in a database cache 332.

In accordance with some embodiments of the invention, one or more of the end user terminal 330 can include a program, application or other software element or module 334, resident on the device that is adapted to retrieve information from the eANSDF server 310 to implement policies and perform network selection decision making, as well as, reporting network administrative and performance information to the eANDSF server 310. The software module 334 can be adapted to receive network performance data, including for example, network quality scores for one or more wireless networks 302 within range of the wireless end user terminal 330. In some embodiment, the software module 334 can be configured to send location information to the eANDSF server 310 and the eANDSF server 310 can send back quality scores for wireless networks or wireless access points known to be in that location. The software module 334 can also be configured to connect to the eANDSF server 310 or Operator computer 320 to obtain new policy information as well as updates to existing policy information. In some embodiments, the policy information can be stored in the same database 312 as the performance data and quality scores. In other embodiments, the eANDSF server 310 can include a separate database, for example, a separate policy database for each operator or cellular carrier. Alternatively, the network policy information can be provided by the network operator 320 as part of a separate transaction.

In accordance with some embodiments of the invention, one or more eANDSF servers 310 can be connected to one or more of the wireless networks 302. Each eANDSF server 310 can include a program, application or other software element or module 314 that is adapted and configured to receive network information from end user terminals 330, store the information in the database 312 and determine secondary information, as well as, quality scores which can also be stored in the database 312 and associated with a wireless network or a specific wireless network access point. The program module 314 can also be adapted and configured to receive network connection policy information from the operator computer 320. The program module 314 can also be adapted and configured to send (at least one of) network performance information, quality scores and connection policy information to end user wireless terminals 330.

Calculating "Location Scores"

Access Point Quality Formulas

In accordance with some embodiments of the invention, formulas for computing the Access Point Quality Scores can include:

$$Q_w = \Sigma k_w \cdot h_w$$

$$Q_c = \Sigma K_c \cdot h_c$$

Where:

| Par. | Description |
|---|---|
| $Q_w$ | Wireless Access Point Quality |
| $k_w$ | Weight of a single wireless network parameter |
| $h_w$ | Value of a single parameter for this wireless Access Point |
| $Q_c$ | Cellular Quality in the vicinity of the wireless Access Point |
| $K_c$ | Weight of a single cellular parameter |
| $h_c$ | Value of a single cellular parameter for this wireless Access Point location |

Historical and Real Time Parameters

In addition to access point parameters, additional historical and run-time or real-time information can also be used in the connection decision. Table 1 provides examples of some of these parameters. Some of the parameters available from the eANDSF server 310 are historical parameters as the server 310 can receive periodic updates from one or more of the end user terminals 330 in an area and store historical information or information representing trends derived from data collected over a period of time. For example, the eANDSF server 310 can store historical information indicating that after a specific time (local time), the performance tends to decrease (people leaving work to hang out in a coffee shop which gets crowded after work) or that the performance tends to increase (during the morning rush, people in a coffee shop finish checking email and leave to go to work). These parameters can be weighted by applying a weighting factor to increase or decrease the amount that a given parameter impacts to the overall score.

Other parameters are only available at run-time on the clients, for example, real time data about a network signal or a network connection type (e.g., WiFi, b/g/n and whether QoS is supported). This can include, for example, information provided by the radio receiver components in the end user terminal 330 or by testing or evaluating a wireless network or a wireless network access point to measure, for example, bandwidth or latency. The network or access point quality scores can include historical information and run-time information, for example:

$$Q_w = \Sigma k_w \cdot h_w + \Sigma p_w \cdot r_w$$

$$Q_c = \Sigma K_c \cdot h_c + \Sigma p_c \cdot r_c$$

Where:

| Par. | Description |
|---|---|
| $Q_w$ | Wireless Access Point Quality |
| $k_w$ | Weight of a single historical wireless Access Point parameter |
| $h_w$ | Value of a single historical parameter for this wireless Access Point |
| $p_w$ | Weight of a single real-time wireless Access Point parameter |
| $r_w$ | Value of a single real-time parameter for this wireless Access Point |
| $Q_c$ | Cellular Quality in the vicinity of the wireless Access Point |
| $K_c$ | Weight of a single historical cellular parameter |
| $h_c$ | Value of a single historical cellular parameter for this wireless Access Point location |
| $p_c$ | Weight of a single real-time cellular parameter |
| $r_c$ | Value of a single real-time cellular parameter for this wireless Access Point location |

In accordance with some embodiments of the invention, more than one historical parameter and/or more than one real-time parameter can be used determine the quality score. In some embodiments of the invention, the network policy can identify which historical parameters and which real-time parameters can or should be used and provide weight values for each parameter For example, the network policy can be provided in an HTML or XML format, where the tags indicate the specified historical and real-time parameters as well as other parameters and formulas for determining quality scores.

Server and Client

In accordance with one embodiment of the invention, the quality score can be determined as a function of information obtained from the database 312 and information determined at run-time by the end user terminal 330. For example, if H indicates historical information, the historical information component of the quality score can be determined from:

$$H_w = \Sigma k_w \cdot h_w$$

$$H_c = \Sigma k_c \cdot h_c$$

Where, H is the historical information component of the quality score and the historical information component can be added to the run-time component of the quality score to produce an access point quality score for the cellular network and the wireless network.

$$Q_w = H_w + \Sigma p_w \cdot r_w$$

$$Q_c = H_c + \Sigma p_c \cdot r_c$$

In this embodiment, the $H_w$ and $H_c$ components can be computed by the eANDSF server 310 and the real-time components can be computed and provided by the software module 334 at the end user wireless terminal 330. The end user wireless terminal 330 can combine the $H_w$ and $H_c$ components received from the eANDSF server 310 with real-time components weighted according to weighting values provided in the network connection policy to produce an access point quality score for each wireless network access point under consideration. The access point corresponding to the highest access point quality score can be selected.

Figure 4:
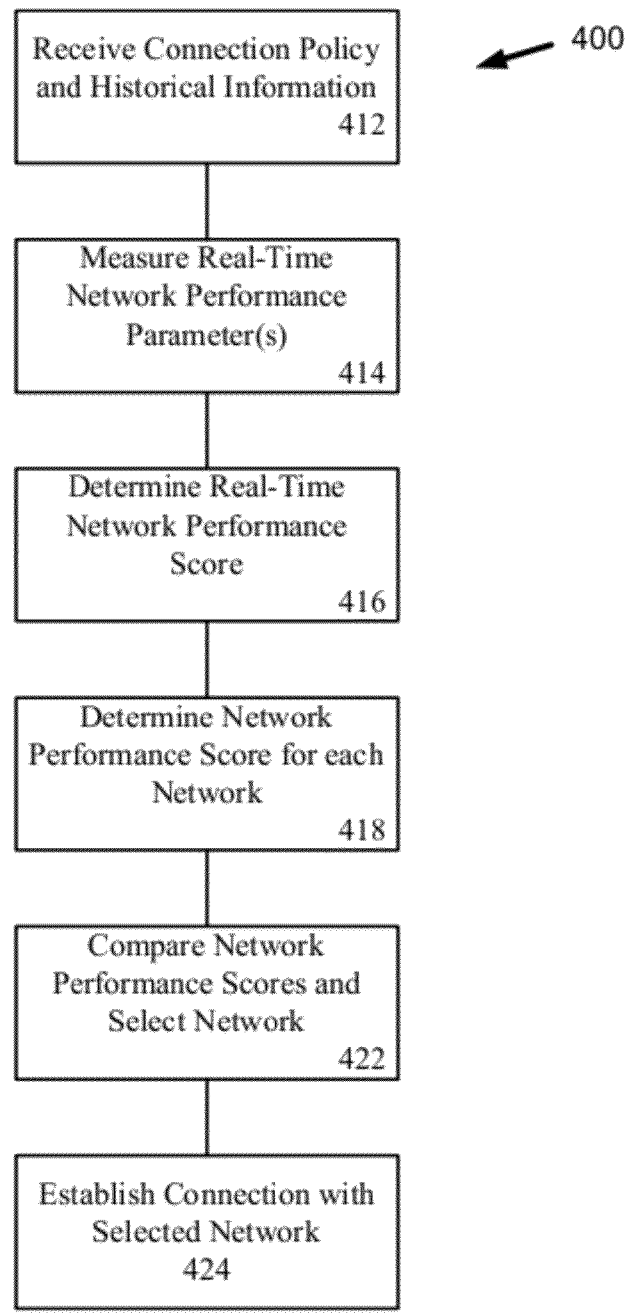
FIG. 4 is a diagrammatic view of a method according to the invention.
Figure 5:
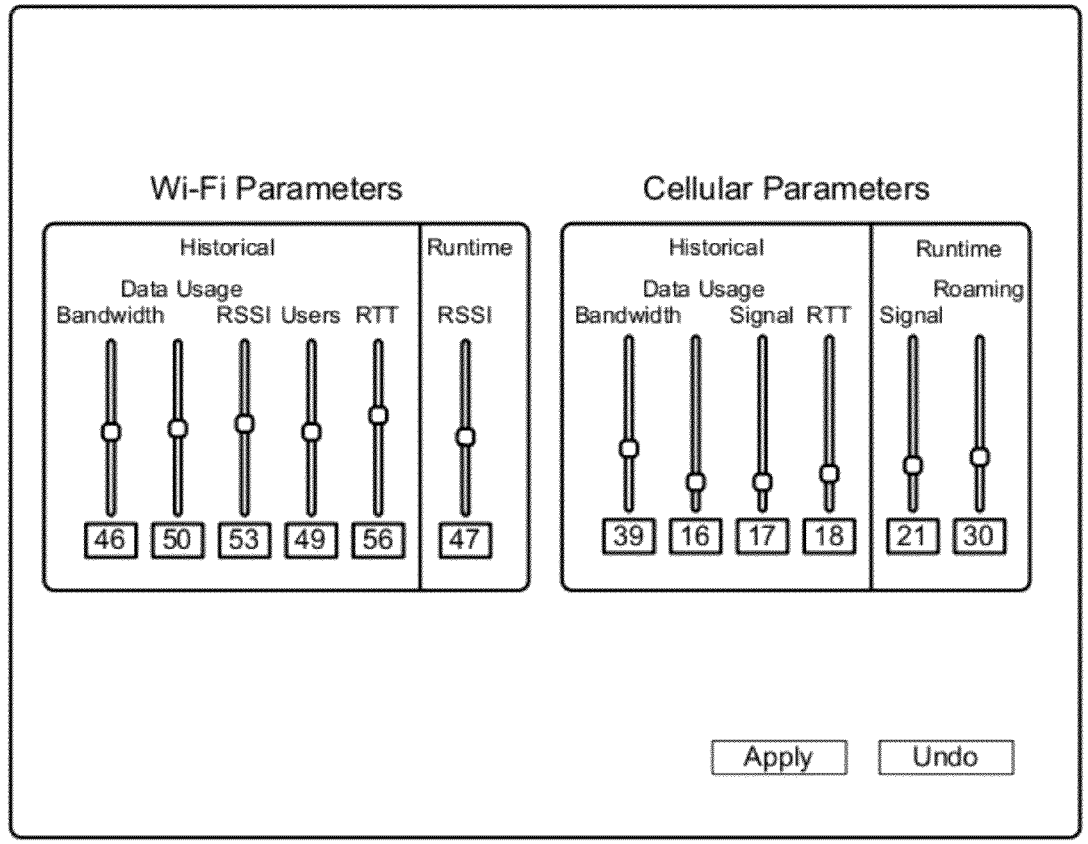
FIG. 5 is a diagrammatic view of a policy adjustment interface according to the invention.

FIG. 4 shows a flow diagram of a method 400 for use in an end user terminal for selecting one of a plurality of available wireless networks. In accordance with one embodiment of the invention, the end user terminal receives an operator/carrier network connection policy from either a network server or an operator/carrier computer, 412. The network connection policy can include weighting values for weighting network performance parameters measured by the end user terminal in determining a network quality score for a given network. The end user terminal can also receive historical performance information or a historical quality score received from the network server. The historical quality score can be determined by weighting and combining one or more historical network performance parameters stored by the network server in a network database. During operation of the end user terminal, the end user terminal detects wireless networks that become available for connection and the end user terminal measures real-time network performance parameters for each network, 414. In some configurations, the end user terminal can establish a temporary connection with one or more of the available network access points and measure one or more network performance parameters, for example, connection speed, connection speed variance, signal strength, signal strength variance, noise, signal to noise ratio, available bandwidth, number of other users, dropped connections rate, packet error rate, packet loss rate, round trip delay, round trip delay variance and backhaul bandwidth. The end user terminal can use one or more of the real-time performance parameters to generate a real-time performance score, 416. The real-time performance score can be determined by weighting and combining one or more measured real-time performance parameters. The weighting values can be obtained from the operator/carrier network connection policy. The end user terminal can determine the network performance or quality score for each available network by combining the historical quality score and the real-time performance score for each available network, 418. The end user terminal can select one network to connect to as a function of the network quality scores for each available network, 422. In some embodiments of the invention, the network quality scores can be compared and the network with the highest quality score can be selected. The end user terminal can connect to the selected network, 424. In accordance with some embodiments of the invention, the network selection process can be repeated, (either periodically or where measured performance parameter change, such as by a predetermined threshold) for example, to determine if a network with a better quality score is available or if the network performance of the selected network begins to deteriorate over time.

In accordance with some embodiments of the invention, the values for k and K can be set according to the cellular operator or carrier's preferences, and can be changed from time to time as new wireless networks become available and existing wireless networks change in performance, as well as to adapt to changes in the carrier's cellular or other wireless infrastructure. When these parameters are changed, a new cache file can be generated for the Carrier and distributed to the end user wireless terminals 330 and the eANDSF servers 310.

The values for all h's come from measurements sent by clients. Those values can be stored according to access point/ location time period during the day, week etc. and carrier/ operator. In some embodiments, the h values can have defaults that can be set by the cellular operator or carrier whereby, if an Access Point does not have a measurement for a certain h, the default value is used. In accordance with some embodiments of the invention, the default values for H/h can be used for wireless Access Points that do not appear in the cache. The default values can be calculated using the K/k values and the default h values.

In accordance with one embodiment, the quality cache can include one or more of the following parameters for each wireless Access Point: BSSID, 5 values of $H_w$ (One for each day slice, and one for a whole day), 5 values of $H_c$ (One for each day slice, and one for a whole day), and the following global parameters: Default $H_w$ ($\Sigma k_w \cdot default\_h_w$), Max $H_w$ ($\Sigma k_w \cdot 1$), Default $H_c$ ($\Sigma k_c \cdot default\_h_c$), Max $H_c$ ($\Sigma k_c \cdot 1$), All p values.

In accordance with some embodiments of the invention, the wireless end user terminal 330 can include a connection algorithm or module that determines an Access Point Quality value as a function of the wireless access point parameter and weighting as discussed above. In accordance with the invention, the wireless end user terminal 330, as part of the connection algorithm or connection module processing, the quality value for two Access Points can be compared and the access point with the highest quality value (or the lowest) can selected and the device can initiate the establishment of a connection with that access point. In accordance with some embodiments of the invention, the quality value of one or more wireless Access Points can be compared to the quality value for the cellular network at that location. Where the quality value for the cellular network is greater than the quality of the wireless access point, the device can either maintain its connection with the cellular network or (where it is using another wireless access point) disconnect from the wireless access point and initiate the establishment of a connection with the cellular network.

In accordance with some embodiments of the invention, for each Access Point, the software module 334 can determine the value of $Q_w = H_w + \Sigma p_w \cdot r_w$. In some embodiments, $H_w$ can be obtained from the Access Point data in the cache 330 stored by the end user wireless terminal 330. In situations where the Access Point data is not in the database cache 332, the default value (also taken from the database cache) can be used. The p values can also be taken from the database cache. The r values can be derived from real time or run-time values measured for the wireless Access Point by the end user wireless terminal 330.

In accordance with some embodiments of the invention, the end user wireless terminal computes a global $Q_c$ value: $Q_c = H_c + \Sigma p_c \cdot r_c$, where $H_c$ can be obtained from the Access Point with the strongest RSSI, which has a (non-default) $H_c$ value (If no Access Point has a $H_c$ value, then the default value (also taken from the database cache) can be used). The p values can also be taken from the database cache. The r values can be derived from real time or run-time values measured for the cellular network by the end user wireless terminal 330.

In accordance with some embodiments of the invention, the connection algorithm or module can identify all wireless Access Points, for which $Q_w > Q_c$. When the next Access Point to return does not meet this condition, the connection algorithm or module returns "Use cellular" instead of it (and then restarts the iteration).

TABLE 1

Parameters Tables

| Name | Type | Normalization (from raw value to h) | Default h |
|---|---|---|---|
| Bandwidth | Historical | min(value, 10 Mbps)/10 Mbps (can use logarithmic normalization instead of linear) | 0.50 (5 Mbps) |
| Usage (Rx) | Historical | min(value, 10 GB)/10 GB | 0.50 (5 GB) |
| Historical RSSI | Historical | Note: different devices uses different ranges. For example, PC RSSI values are between 0 and −100, where 0 is the strongest. However, −30 is considered max RSSI for the GUI and −90 is considered minimum. Server can be configured to receive an RSSI report from many different platforms and convert it to the appropriate scale before saving it. For example: | 0.83 (−40) |

TABLE 1-continued

Parameters Tables

| Name | Type | Normalization (from raw value to h) | Default h |
|---|---|---|---|
| | | if (value < −90)<br>  value = −90;<br>if (value > −30)<br>  value = −30;<br>normalized = (value + 90)/60 | |
| Connected users | Historical | min(value, 10)/10 | 0.30 (3 users) |
| Network latency | Historical | 1 − (min(value, 1000 ms)/1000 ms) | 0.95 (50 ms) |
| RSSI | Real-Time | Same as Historical RSSI | 0.83 (−40) |
| Usage (Rx) | Historical | min(value, 10 GB)/10 GB | 0.50 (5 GB) |

Operator Policy Adjustment

In accordance with some embodiments of the invention, the operator policy can be used to assign weighting values used to determine network quality score values. The weighting values can range from 0-100 or 0-1.0 and can be used as multiplier of the network parameter that can be used to determine the network quality score. In accordance with some embodiments, the operator policy can be used at the server to weight historical quality score parameters and at the end user terminal to weight the real-time quality score parameters. In this embodiment, the portion of the quality score for a wireless access point reflecting the historical information can be determined at the server and transmitted to the wireless end user terminal, and, for example, stored in the cache. When the end user terminal comes within range of the wireless access point, the end user terminal can determine the portion of the quality score for the wireless access point reflecting the real-time information and the real-time portion of the quality score can be combined with historical portion of the quality score to determine current quality score for the wireless access point (and the cellular access point/network at the location). The quality scores for each available network can be compared and the selection of the wireless network (or decision to stay connected to the cellular network) can be determined as a function of the quality scores for each network, for example, by a comparison of the quality score. In accordance with some embodiments of the invention, additional connection policy parameters can require a comparison threshold—a difference greater than a set value or percentage. In accordance with some embodiments of the invention, the connection policy can also include different switching threshold information depending on whether the wireless end user terminal is initially connected to the cellular network or a different wireless network, providing a hysteresis, to prevent undesired connection switching when the quality scores are close or change rapidly. Thus, for example, the connection policy can "prefer" the cellular network to another wireless network in some circumstances (user has unlimited data plan or the best wireless network has a high data rate cost) or "prefer" a local WiFi network that is owned by the end user.

In accordance with some embodiments, the connection policy can use an XML based policy definition format and the policy definition can be changed by the cellular network operator or carrier. In this embodiment, the carrier/operators' technical team can adjust the way the quality scores are being determined. FIG. 6 shows an example of an equalizer style user interface that can be used by a carrier/operator to adjust the connection policy weighting values. The equalizer style control enables the carrier/operator to emphasize and de-emphasize cellular and WiFi parameters according to the carrier/operator's preferences.

Administrative policies can be modified or expanded by performance scores or performance data. These policies can be expanded to incorporate dependencies on real-time and historical performance data. Examples of expanded policies are provided below:

A. UE will not connect to XX network between 2 to 4 PM unless score of XX network is 2X the score of the default cellular network.

B. UE can connect to a public WiFi if and only if RSSI of cellular radio is below YY dBm.

C. UE will not select public WiFi network but will select home network if VoIP application is engaged unless score of cellular network is below ZZ value and score of public network is bigger than Z1 value.

Other embodiments are within the scope and spirit of the invention. For example, due to the nature of software, functions described above can be implemented using software, hardware, firmware, hardwiring, or combinations of any of these. Features implementing functions may also be physically located at various positions, including being distributed such that portions of functions are implemented at different physical locations.

Further, while the description above refers to the invention, the description may include more than one invention.

The invention claimed is:

1. A method for selecting and establishing a connection to a network, the method comprising:
  receiving a network connection policy from a network server, wherein the network connection policy comprises one or more weighting factors;
  detecting a plurality of available networks;
  receiving, from a network server, historical network performance information about at least one of the plurality of available networks;
  measuring real-time network performance information associated with a particular one of the plurality of available networks, the network performance information including one or more network performance parameters;
  storing the real-time network performance information in memory;
  determining a real-time network score based on an application of the one or more weighting factors to the one or more network performance parameters;
  determining a network quality score associated with the particular one of the plurality of available networks based on the historical network performance information and the real-time network score;
  selecting the particular one of the plurality of available networks based on a comparison between the network quality score associated with the particular one of the plurality of available networks and at least one other network quality score associated with another one of the plurality of available networks; and establishing a connection with the particular one of the plurality of available networks based on the selection.

2. The method of claim 1, wherein the historical network performance information is determined based on network performance information received by the network server from a plurality of end user terminals.

3. The method of claim 1, wherein determining the network quality score further comprises applying weights to the historical network performance score and real-time network score and combining the weighted historical network performance score and the real-time network score.

4. The method of claim 3, wherein determining the network quality score further comprises assigning less weight to the real-time network score as the real-time network performance information ages.

5. The method of claim 1, wherein the historical network performance information comprises a historical quality score, wherein the historical quality score is determined by weighting and combining one or more historical network performance parameters.

6. A device for selecting and establishing a connection to a network, the device comprising:
a processor;
memory having instruction which, when executed by the processor, cause the device to perform operations comprising:
receiving a network connection policy from a network server, wherein the network connection policy comprises one or more weighting factors;
detecting a plurality of available networks;
receiving, from a network server, historical network performance information about at least one of the plurality of available networks;
measuring real-time network performance information associated with a particular one of the plurality of available networks, the network performance information including one or more network performance parameters;
storing the real-time network performance information in memory;
determining a real-time network score based on an application of the one or more weighting factors to the one or more network performance parameters;
determining a network quality score associated with the particular one of the plurality of available networks based on the historical network performance information and the real-time network score;
selecting the particular one of the plurality of available networks based on a comparison between the network quality score associated with the particular one of the plurality of available networks and at least one other network quality score associated with another one of the plurality of available networks; and
establishing a connection with the particular one of the plurality of available networks based on the selection.

7. The device of claim 6, wherein the historical network performance information is determined based on network performance information received by the network server from a plurality of end user terminals.

8. The device of claim 6, wherein determining the network quality score further comprises applying weights to the historical network performance score and real-time network score and combining the weighted historical network performance score and the real-time network score.

9. The device of claim 8, wherein determining the network quality score further comprises assigning less weight to the real-time network score as the real-time network performance information ages.

10. The device of claim 6, wherein the historical network performance information comprises a historical quality score, wherein the historical quality score is determined by weighting and combining one or more historical network performance parameters.

11. A non-transitory computer-readable medium for selecting and establishing a connection to a network comprising instructions for an electronic device, the instructions, when executed by a processor, causing the electronic device to perform operations comprising:
receiving a network connection policy from a network server, wherein the network connection policy comprises one or more weighting factors;
detecting a plurality of available networks;
receiving, from a network server, historical network performance information about at least one of the plurality of available networks;
measuring real-time network performance information associated with a particular one of the plurality of available networks, the network performance information including one or more network performance parameters;
storing the real-time network performance information in memory;
determining a real-time network score based on an application of the one or more weighting factors to the one or more network performance parameters;
determining a network quality score associated with the particular one of the plurality of available networks based on the historical network performance information and the real-time network score;
selecting the particular one of the plurality of available networks based on a comparison between the network quality score associated with the particular one of the plurality of available networks and at least one other network quality score associated with another one of the plurality of available networks; and
establishing a connection with the particular one of the plurality of available networks based on the selection.

12. The non-transitory computer-readable medium of claim 11, wherein the historical network performance information is determined based on network performance information received by the network server from a plurality of end user terminals.

13. The non-transitory computer-readable medium of claim 11, wherein determining the network quality score further comprises applying weights to the historical network performance score and real-time network score and combining the weighted historical network performance score and the real-time network score.

14. The non-transitory computer-readable medium of claim 13, wherein determining the network quality score further comprises assigning less weight to the real-time network score as the real-time network performance information ages.

15. The non-transitory computer-readable medium of claim 11, wherein the historical network performance information comprises a historical quality score, wherein the historical quality score is determined by weighting and combining one or more historical network performance parameters.

* * * * *